UNITED STATES PATENT OFFICE 2,265,347

METHOD OF PREPARING DITHIAZYL DISULPHIDES

Edward L. Carr, Akron, Ohio, assignor to The Firestone Tire & Rubber Company, Akron, Ohio, a corporation of Ohio No Drawing. Application May 13, 1939, Serial No. 273,519

5 Claims. (Cl. 260—306)

This invention relates to an improved method of preparing dithiazyl disulphides and more particularly, to improvements in the methods of oxidizing 2-mercaptothiazoles to the corresponding dithiazyl disulphides.

A primary object of the present invention is to provide an improved method of preparing dithiazyl disulphides by oxidation of the corresponding mercaptothiazoles, by which a purer product is obtained at a lower cost.

Another object is to provide a method by which chlorine gas or bromine vapor may be efficiently utilized for preparing dithiazyl disulfides, particularly dibenzothiazyl disulfide or other di (benzenoid-thiazyl) disulphides.

The invention broadly contemplates preparing a dithiazyl disulphide by treating a mercaptothiazole in aqueous medium with chlorine or bromine. The mercaptothiazole, if not soluble in water, may be suspended uniformly in water by known methods or may be held in water solution in the form of a soluble salt. Preferably the oxidizing reagent is gradually introduced into the agitated aqueous reaction medium in the form of a gas or vapor. Said reagent may be introduced beneath the surface of the liquid in the form of the pure gas or admixed with an inert gas such as air. Moreover, the reagent may be introduced into the atmosphere above the surface of the liquid and the latter stirred so as to facilitate absorption of the reagent by the liquid. The reaction may be conveniently carried out at ordinary room temperatures and may be readily controlled by controlling the rate of addition of the halogen and/or the speed of agitation of the solution. The pure disulphides are thus obtained in highly satisfactory yields at low cost.

It is surprising, in view of the prior art, that chlorine or bromine can be used successfully to prepare dithiazyl disulphides from the corresponding mercaptothiazoles. Some prior attempts to use chlorine in this reaction resulted in the formation of such highly oxidized products as sulphinic acids and sulphonic acids, because of too high reaction temperatures and/or other unfavorable conditions. Moreover, it has been known in the past to prepare a 2-chlorothiazole by treating the corresponding mercaptothiazole with chlorine gas, as is directed in United States Patent No. 1,757,930. Excellent results are achieved according to the present invention by the use of relatively low temperatures, relatively dilute solutions or suspensions, and by even and gradual introduction of the reagent to the agitated reaction solution.

The following examples are given as illustrative of the invention but not in limitation thereof.

Example 1

In the preparation of di-benzothiazyl disulphide having the formula

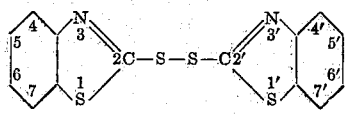

100 grams of commercial mercaptobenzothiazole (92 per cent 2-mercaptobenzothiazole) were treated with 2500 cc. of an aqueous alkaline solution containing the required amount of base to form the sodium salt of the mercaptobenzothiazole. The insoluble residue of 8 grams was filtered off and the solution partially decolorized by means of activated carbon. This solution, at room temperature, was vigorously stirred while chlorine gas was introduced into the space above the solution. The chlorine was absorbed by the solution and di-benzothiazyl disulphide was rapidly precipitated as a fine powder. The yield was 91% of the theoretical. The melting point of the product was 171° C. Obviously, a slightly higher yield would be obtained by the elimination of the step of treating the original mercaptothiazole salt solution with charcoal.

The following equation is believed to represent the course of this reaction:

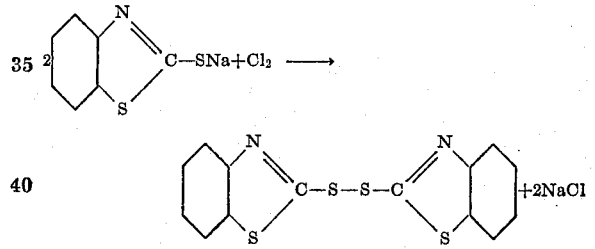

Example 2

In a similar manner, bromine has been found suitable for carrying out the present invention. An aqueous solution (150 cc.) containing 10 grams of mercaptobenzothiazole in the form of the sodium salt was vigorously stirred and allowed to absorb bromine vapor at its surface. The white product, which rapidly precipitated, was washed once with dilute alkali and then recrystallized from a mixture of benzene and petroleum ether. This alkali-insoluble crystalline product had a melting point of 175–176° C.

The mixed melting point with authentic dibenzothiazyl disulphide was 176–177° C.

In addition to the mercaptothiazoles disclosed in the above examples, any other mercaptothiazole having the grouping

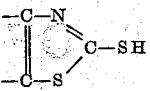

may be employed, examples being 2-mercapto-4-methyl-thiazole, 2-mercapto-4-phenyl-thiazole and mercapto-benzenoid-thiazoles, such as 2-mercaptobenzothiazole, 2-mercapto-4-phenyl-benzothiazole, 2-mercapto-6-phenyl-benzothiazole, 2-mercapto-naptho-thiazole and homologues or the various ring substitution products of these substances. As typical ring substituents there may be mentioned nitro, halogen, hydroxyl and alkoxyl groups.

Although a preferred form of the invention has been described in detail, it will be apparent to those skilled in the art that the invention is not so limited but that various modifications may be made therein without departing from the spirit of the invention or from the scope of the appended claims. Thus, for example, the process may be satisfactorily carried out by introducing chlorine gas or bromine vapor beneath the surface of the reaction solution with or without additional agitation of the solution; the gaseous or vaporous reagent may be diluted with an inert gas, such as air if desired; a water solution of chlorine or bromine may also be satisfactorily employed as the reagent for the present process.

What is claimed is:

1. A method of preparing dibenzothiazyl disulphide which comprises treating one molar proportion of 2-mercaptobenzothiazole in an aqueous medium at room temperature with substantially one-half molar proportion of a substance selected from the group consisting of elemental chlorine and elemental bromine.

2. A method of preparing dibenzothiazyl disulphide which comprises treating at room temperature an aqueous solution of a soluble inorganic salt of one molar proportion of 2-mercaptobenzothiazole with substantially one-half molar proportion of elemental chlorine.

3. A method of preparing a dithiazyl disulphide which comprises treating one molar proportion of a 2-mercaptothiazole in an aqueous medium at room temperature with substantially one-half molar proportion of a substance selected from the group consisting of elemental chlorine and elemental bromine.

4. A method of preparing a di(benzenoid thiazyl) disulphide which comprises treating one molar proportion of a 2-mercapto-benzenoid-thiazole in an aqueous medium at room temperature with substantially one-half molar proportion of a substance selected from the group consisting of elemental chlorine and elemental bromine, said substance being introduced in the vapor phase to said aqueous medium.

5. A method of preparing a dithiazyl disulphide which comprises gradually adding a substance selected from the group consisting of elemental chlorine and elemental bromine to a 2-mercaptothiazole in an aqueous medium at room temperature to cause the formation and precipitation of the disulphide, and discontinuing the adding of said substance as soon as the precipitation of the disulphide has ceased.

EDWARD L. CARR.